United States Patent
Shepard, Jr.

(10) Patent No.: US 10,694,303 B2
(45) Date of Patent: Jun. 23, 2020

(54) SYSTEM AND METHOD FOR BROADCASTING AUDIO

(71) Applicant: THE BOARD OF TRUSTEES OF THE UNIVERSITY OF ALABAMA, Tuscaloosa, AL (US)

(72) Inventor: William Steve Shepard, Jr., Northport, AL (US)

(73) Assignee: The Board of Trustees of the University of Alabama, Tuscaloosa, AL (US)

( * ) Notice: Subject to any disclaimer, the term of this patent is extended or adjusted under 35 U.S.C. 154(b) by 0 days.

(21) Appl. No.: 16/249,269

(22) Filed: Jan. 16, 2019

(65) Prior Publication Data

US 2019/0222947 A1    Jul. 18, 2019

Related U.S. Application Data

(60) Provisional application No. 62/617,826, filed on Jan. 16, 2018.

(51) Int. Cl.
| | |
|---|---|
| *H04R 27/00* | (2006.01) |
| *B64B 1/50* | (2006.01) |
| *B64D 47/02* | (2006.01) |
| *H04R 1/02* | (2006.01) |

(52) U.S. Cl.
CPC ............... *H04R 27/00* (2013.01); *B64B 1/50* (2013.01); *B64D 47/02* (2013.01); *H04R 1/026* (2013.01); *H04R 2420/07* (2013.01)

(58) Field of Classification Search
None
See application file for complete search history.

(56) References Cited

U.S. PATENT DOCUMENTS

| | | | |
|---|---|---|---|
| 2003/0025034 A1* | 2/2003 | Akahori | B64B 1/06 244/96 |
| 2005/0259150 A1* | 11/2005 | Furumi | G09F 21/06 348/144 |
| 2008/0304677 A1* | 12/2008 | Abolfathi | G10K 11/178 381/71.1 |
| 2018/0316997 A1* | 11/2018 | Benun | H04R 1/028 |
| 2019/0030447 A1* | 1/2019 | Zima | A63H 27/10 |

FOREIGN PATENT DOCUMENTS

JP           05294288 A    *  11/1993

\* cited by examiner

*Primary Examiner* — James K Mooney
(74) *Attorney, Agent, or Firm* — Meunier Carlin & Curfman LLC (57) ABSTRACT

A sound system for broadcasting audio is disclosed. The sound system utilizes speaker unit carried by a lighter-than-air airship that is connected to a base station using a tether. The airship elevates the speaker unit to a height much larger than the height of the largest ground obstruction. Accordingly, more listeners may hear and understand the message because multipath reflections and shadow regions are reduced.

36 Claims, 5 Drawing Sheets

SYSTEM AND METHOD FOR BROADCASTING AUDIO

CROSS-REFERENCE TO RELATED APPLICATION

This application claims priority to and benefit of U.S. provisional patent application Ser. No. 62/617,826 filed Jan. 16, 2018, which is fully incorporated by reference and made a part hereof.

FIELD OF THE INVENTION

The present disclosure relates to sound systems and more specifically, to an elevated sound system including a speaker unit that is lifted by a lighter-than-air airship to broadcast audio to a wide area without multipath distortion and with sufficient power for intelligible interpretation.

BACKGROUND

Generally speaking, large facilities, such as university campuses or military bases, rely on an exterior sound system for broadcasting alerts and/or messages. For example, during a time of emergency the sound system may broadcast an alert tone to indicate the instance of an emergency or an emergency type. The alert tone is often followed by a voice announcement, which can include important instructions and/or announcements. The announcements broadcast are not limited to emergencies, however, and can be used in almost any scenario.

The sound system typically includes multiple speaker units (i.e. loudspeakers, speakers, speaker sources) that are installed outside and around the facility on poles, on tops of buildings, or on sides of buildings. The speaker units may receive audio signals (i.e., messages) via wires or wirelessly via radio waves.

Because the speaker units are typically positioned at a relatively low height (with respect to obstructions) and are typically oriented to project audio in a horizontal direction aligned with the ground, listeners may find the broadcasted audio messages intelligible in certain circumstances.

For example, the power (i.e., sound pressure level) of the speaker unit may be adjusted to avoid harming users that are proximate to the speaker unit. As a result, a listener that is located at a large distance from a speaker unit may not be able to hear the announcement.

To accommodate more listeners, more speaker units may be added to the facility. However, multiple speaker units can produce overlapping audio in an area. The overlapping audio is comprised of replica audio signals that are delayed relative to each other. As a result, a listener may not be able to understand the announcement.

Buildings in the facility may block audio from being received in areas (i.e., shadow regions) or may produce echoes caused by reflections that reduce intelligibility due to the overlapping audio described previously.

Time delays may be applied to speakers in a system to mitigate the overlapping audio for a particular area, but this is not effective for wide area broadcasting and requires customization that is not suitable for portable or temporary sound systems.

Often sound systems are needed on an ad hoc basis. For example, a natural disaster, an act of terrorism, a power/communication outage, or any other disruption in normalcy may require a sound system to broadcast important messages quickly to a wide area. In addition, there may be commercial and/or public service scenarios that are not life threatening but could also benefit from ad hoc broadcasting of audio messages.

Existing portable sound systems typically include a movable base station that includes a mast with one or more speakers affixed to an end opposite to the base station. The mast may be extended to a height and rotated to provide broadcasting coverage for an area. These portable sound systems suffer, however, from the drawbacks listed above because of the limited height of the mast. Additionally these portable systems may be difficult to quickly arrange and coordinate into the collection of sound systems necessary to provide intelligible audio messages for a wide area.

A need, therefore, exists for a sound system that is capable of broadcasting intelligible audio messages to a wide area without the need for fine-tuning or customized hardware/software and that is capable of being moved, deployed, and stored quickly.

SUMMARY

Accordingly, the present disclosure embraces a method for broadcasting one or more audio messages. In the method, one or more audio messages are received (e.g., from a network, from a memory, or from a microphone) at a base station (e.g., a permanent base station or a trailer-mounted or truck-mounted base station). A lighter-than-air airship (e.g., balloon or blimp) is connected to the base station via a tether and can be deployed to a height (e.g., 20 feet to 4000 feet). The lighter-than-air airship includes a speaker unit that is in communication with the base station. The one or more messages are transmitted (e.g., wired or wirelessly) from the base station to the speaker unit for broadcasting when the lighter-than-air airship is at the height.

In an implementation, the speaker unit is powered by a battery and receives the message from the base station wirelessly, while in other possible implementations, the speaker unit receives power and audio signals from a connection to one or more cables included in the tether.

In another possible implementation, the airship is a blimp that includes one or more propulsion mechanisms that are controllable by the base station to set or maintain a direction of broadcasting and/or an area to receive the broadcasting. Similarly, the speaker unit may include one or more gimbal positioners that are controllable by the base station to control the direction of broadcasting.

In another possible implementation, the base station includes a tether reel mechanism. The tether-reel mechanism includes a spool that holds the tether and can be controlled to unspool the tether to raise the lighter-than-air airship or spool the tether to lower the light-than air airship.

In other possible implementations, the base station includes an inflation and/or deflation mechanism that fills the lighter-than-air airship with a buoyant gas prior to the airship being deployed. After the one or more messages are broadcast, the lighter-than air airship is retracted and the deflation mechanism removes the buoyant gas.

In another aspect, the present disclosure embraces a sound system for broadcasting a message. The sound system includes a lighter-than-air airship. The airship includes an inflatable envelope that when filled with a buoyant gas provides a buoyant lift. The system also includes a tether. The tether is typically connected to the inflatable envelope at a bottom portion of the inflatable envelope. A speaker unit is attached to the connection member and is directed in a downward direction away from the airship (i.e., towards the ground). The tether holding the air ship is also connected to a base station at a tether-reel mechanism. The base station includes a processor that is configured by program instructions to execute the method and control the components in the various implementations as described above.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

Figure (FIG. 1 schematically depicts conventional sound system and its problems in wide area broadcasting.

In the figures, like reference numerals designate corresponding parts throughout the several views. The figures are schematic representations and so are not necessarily drawn to scale.

DETAILED DESCRIPTION

Figure 1:
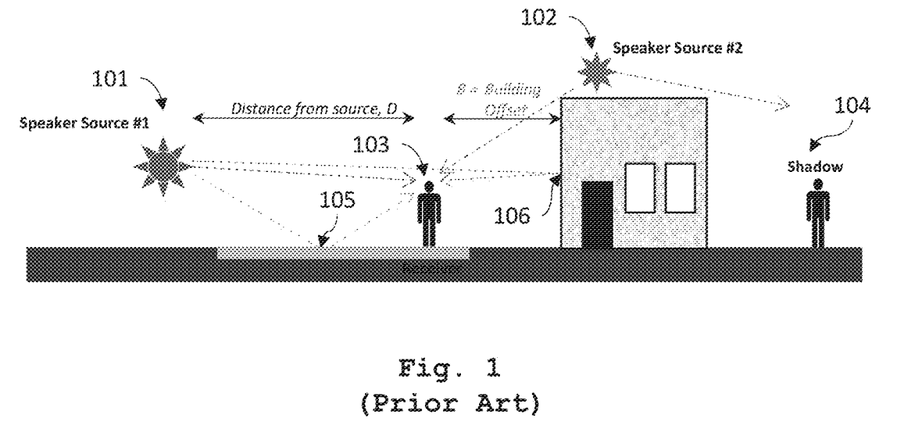

The present disclosure embraces an elevated sound system to mitigate the problems associated with broadcasting audio over a wide area using one or more speakers at heights comparable to nearby buildings. FIG. 1 illustrates the problems associated with conventional sound systems broadcasting a message to a wide area. Two speaker units are shown and each speaker unit transmits the same audio message at the same time. As shown, multipath interference results because a listener 103 hears the message directly from first speaker source (i.e., speaker unit) 101, directly from second speaker unit 102, from a ground reflection 105, and from a building reflection 106. Thus, the message from the speaker source is a sum of overlapping and delayed version of the same message. If the delay is significant (e.g., greater than about 25 milliseconds) then the message is likely unintelligible. Also as shown, a listener 104 may be blocked from hearing either speaker source 101,102 if the listener 104 is positioned in the acoustical shadow created by an obstruction (e.g., a building). As a result, a listener may need to move away from a building to hear/understand a message. This is not convenient in an area with many buildings and so listeners may not receive the message as intended.

Figure 2:
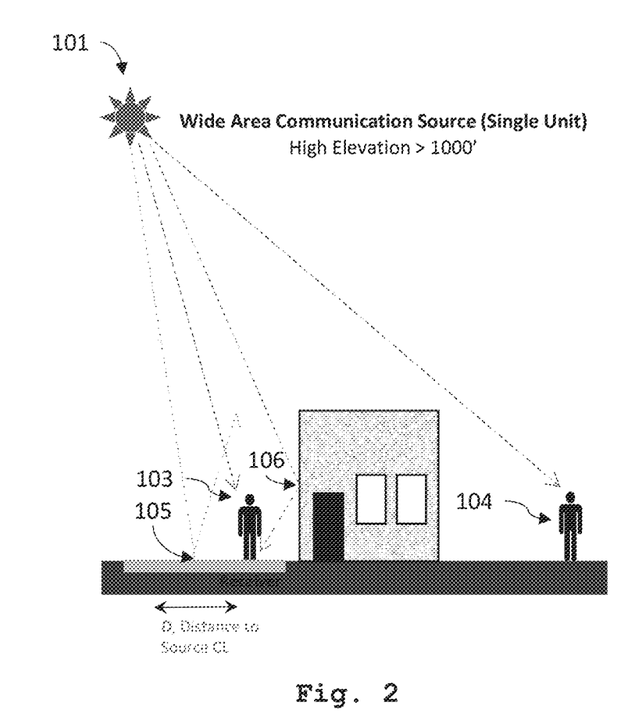
FIG. 2 schematically depicts an elevated sound system and its advantages in wide area broadcasting.

By elevating a speaker unit to a height well above the height of obstructions, these problems may be mitigated. FIG. 2 graphically illustrates the improved scenario. When the speaker unit 102 is elevated to a height well above the height of obstructions (e.g., 1000 feet), then a message may be received by multiple listeners 103,104 in a direct line-of-sight. This eliminates the need for multiple speaker units to cover different areas in a facility, which in turn, eliminates the problem of receiving duplicate messages from different speaker units. In addition, most multipath reflections are directed away from the listener 103 because of the geometry. For example, ground reflections 105 that could affect intelligibility will be directed above the listener 103, and building reflections 106 that could affect intelligibility will be directed below the listener 103. Further, shadow regions are greatly diminished. As a result, a listener 104 may hear and understand a message when they are close to a building. In general, the high altitude of the speaker unit reduces the variation of sound pressure level (SPL) for listeners at different positions in the facility.

Figure 3:
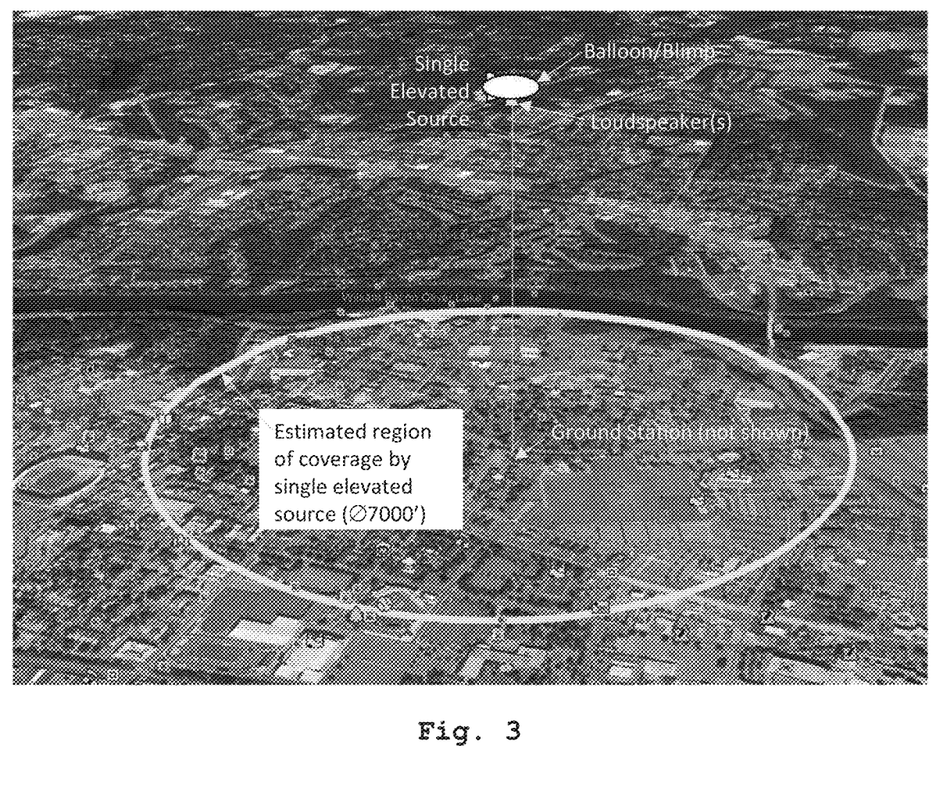
FIG. 3 graphically depicts an elevated sound system and a broadcast area according to an implementation of the present disclosure.

FIG. 3 graphically illustrates an implementation of the present disclosure. A speaker source (e.g., one or more loudspeakers) carried by a lighter-than-air airship (e.g., balloon, blimp, etc.) may be elevated to a height that is well above obstructions and held in place by a tether to a ground station. The height may depend on the height of the obstructions in the announcement area and/or the size of the announcement area. Accordingly, a height in a range of 20 to 4000 feet is typical but in some cases, the height may be even higher than 4000 feet. In this way, listeners within a facility (e.g., military base, arena, university campus, industrial complex) may hear/understand the message. What is more, the disclosed configuration offers the further advantage that no listeners are proximate to the speaker source. Thus, hearing protection is not needed for operators of the base station. As shown, the coverage of the elevated speaker unit can be 7000 feet in diameter. The coverage depends on the speaker unit's height, power, and directivity.

The disclosed sound system (i.e., system) is suitable for rapid deployment, especially for embodiments in which the base station is movable (e.g., trailer-mounted or truck mounted). Accordingly, the disclosed system may be used for responses to disasters (e.g., tornado, hurricane), for public outdoor gatherings (e.g., sporting events), or for law enforcement in situations dangerous to the public (e.g., hostage standoff, active shooter).

In general, it is envisioned that the system may be used in any situation in which one or more audio messages need to be easily broadcast to a group of listeners. The airship height and speaker unit power may be adjusted; therefore, the area covered is not limited to large areas. Further, permanent installations of the disclosed sound system may be used for an area than needs a broadcasted audio message.

Figure 4:
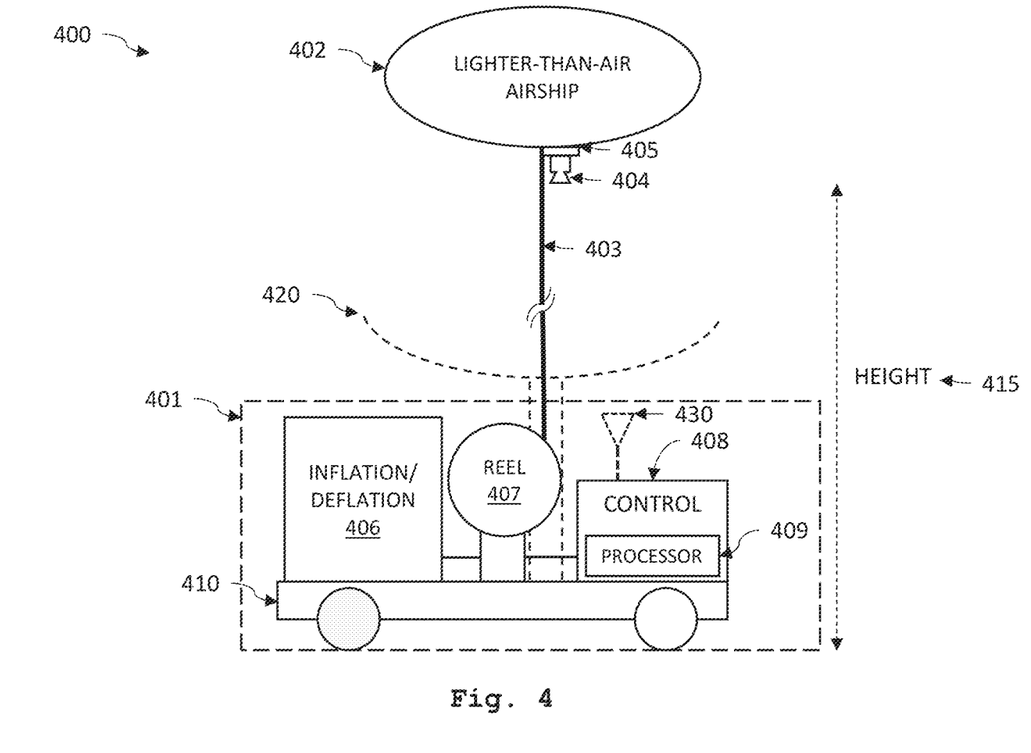
FIG. 4 schematically depicts a system for broadcasting one or more audio messages according to an embodiment of the present disclosure.

FIG. 4 schematically depicts an embodiment of the sound system 400. The sound system 400 generally consist of a base station 401 that is connected to a lighter-than-air airship 402 via a tether 403.

The lighter-than-air airship (i.e., airship) 402 includes an inflatable envelope that can be filled with a buoyant gas (e.g., helium, hot air, etc.) to provide buoyancy to lift the airship to a height (e.g., 20 to 4000 feet) in the atmosphere. The airship may be embodied variously. For example, the airship 402 may be a balloon of various shapes (e.g., spherical or ellipsoidal) or a blimp. The airship 402 may be formed either with or without internal structure and may include one or more aeronautical stabilization members (e.g., fins) that help orient and/or position the airship. Additionally the aeronautical stabilization members may provide stability in weather (e.g., wind). The airship 402 may also include one or more propulsion mechanisms (e.g., propellers, ducted fans, etc.) that control movement or stabilization of the airship. For example, the propulsion mechanisms may be used to position the airship 402 in a position that is not directly over the base station or may propel the airship along a route (e.g., circling the base station). The propulsion mechanisms may be used to orient or stabilize the airship in wind.

The airship 402 may also include one or more ports (e.g., quick connect ports) for inflation and deflation. Accordingly, the airship 402 may inflated as needed (e.g., to a particular pressure) at the base station. For example, the airship 402 may be inflated immediately prior to use and deflated for storage between uses.

The airship 402 may also include a connection member 405 at a bottom portion of the airship (e.g., portion facing the earth when the airship is elevated). The connection member 405 may include receiving features (e.g., threaded holes) to which items (e.g., a speaker unit, tether, etc.) may be connected and/or may define a volume for holding items (i.e., battery, computer, etc.). The connection member 405 may also include various electrical connection points (e.g., connectors) to facilitate the connection of one or more electrical components to other electrical components, to a transmission line, or to a power source.

The sound system 400 also includes a speaker unit 404 affixed to the airship (e.g., via the connection member 405). The speaker unit 404 may be a portable loudspeaker system that includes one or more speakers and electronics for power and amplification functions. The speaker unit 404 may provide amplified audio sound over a range of audible frequencies (e.g., 700-8000 Hz) at a high (e.g., 120-170 decibels) amplitude. The speaker(s) may be directional (e.g., 45 degrees off-axis spread) and are typically directed towards the ground when the airship is elevated.

The speaker unit 404 may also include a receiver for receiving wireless radio frequency (RF) signals (e.g., from the base station). The RF signals can include the audio message(s) for transmission via the speakers. Thus, the speaker unit 404 can further include processing for transforming the received RF signals into audio for broadcast.

In a possible embodiment, the speaker unit 404 may include one or more gimbal positioners (i.e., gimbals) that function to direct the speaker(s) in a particular direction. The gimbals may be controlled remotely by an operator or may by controlled automatically by signals from sensors (e.g., accelerometers). In this way, the speakers may be positioned by the gimbals to compensate for a position of the airship 402 or to point towards different areas on the ground. The speaker unit 404 may also include an electrical connection point for direct or indirect connection to a tether 403.

The tether 403 is attached to the airship 402 to provide a connection to a base station 401. The tether primarily functions to hold the airship at a height. Accordingly, in one possible embodiment, the airship may be connected to the tether directly at the connection member 405. In another possible embodiment, the airship may be connected to the tether by one or more guy-wires that are attached between various locations on the airship and the tether. In another possible embodiment, straps wrapped around the airship may be used to connect the airship to the tether. In some embodiments, the tether further includes one or more electrical cables that conduct signals (e.g., power, audio signals, digital signals, controller signals, etc.) to the electronics incorporated in the airship or lifted by the airship. The tether 403 is flexible and may be spooled for storage or unspooled for deployment.

The base station 401 primarily functions to deploy and control the airship 402 and transmit messages to the speaker unit 404 for broadcast. In some cases, the base station further functions to store the airship when it is not in use. The base station 401 typically has a movable platform 410 (e.g., mounted on a truck or trailer) but may use a fixed platform that is installed in a location that requires announcements.

The base station includes a control system (i.e., control) 408. The control 408 may include a computer with a processor 409 that can be programmed with program instructions. The program instructions may be stored on a non-transitory computer readable memory (i.e., memory) and read by the computer to configure the processor to operate mechanisms or electronics on the base station. Alternatively, the computer may receive program instructions via a network connection to a wired or wireless computer network. In this way, the base station may be controlled by an operator at the base station or by an operation at a remote location. For example, one or more audio messages may be received from a location remote to the base station via a (wired or wireless) computer network. In addition, an operator may deploy the airship from a remote location.

The control 408 may also include an interface (e.g., graphical user interface, remote control, etc.) for an operator to configure and control the function of the system at the base station. The control may also include connection points for receiving input from peripheral devices (e.g., microphone). Thus, a message may also be received for broadcast from an operator speaking into a microphone connected to the control 408. In other words, an operator may broadcast his/her message from the elevated speaker in real time using a microphone connected to the base station. Alternatively, pre-recorded messages may be selected and retrieved from a memory (e.g., RAM, ROM, disk, etc.) in the control 408.

The control 408 may include the necessary electronics to communicate to the airship 402, a network, and/or a user interface (e.g., remote control, microphone, etc.) wirelessly. Accordingly, the control 408 may include a radio frequency transceiver and an antenna 430 to transmit and receive information.

The base station 401 includes a reel mechanism (i.e., reel) 407 that functions to spool or unspool the tether to raise or lower the airship 402. The reel 407 may be operated by a human or may be controlled by the control 408. For example, an operator may position the airship 402 a height 415 by specifying the height in the graphical user interface of the control 408. Upon receiving the height, the control 480 may automatically cause the reel 407 to spool/unspool the tether accordingly. In another implementation, a user may input (e.g., at the base station or remotely) a desired coverage region (e.g., a diameter of an estimated region of coverage, as shown in FIG. 3) to the control 480. Upon receiving the desired coverage region, the control may compute an appropriate height based on the performance characteristics of the speaker system and/or current weather/wind conditions (e.g., received at a weather station communicatively coupled to the control). The base station may then automatically unspool the tether to raise the airship 402 to the computed height. It should be noted, while unspooling (and spooling) typically includes the operation of rotating a reel on to which the tether is wrapped, the present disclosure recognizes that spooling/unspooling may be accomplished using any operation of feeding the tether and therefore is not limited to any particular embodiment.

The base station 401 may also include an inflation and/or a deflation mechanism (i.e., inflation/deflation) 406. The airship may be connected via a port to the inflation/deflation mechanism for receiving/delivering buoyant gas to/from the inflatable envelope. For example, the airship 402 may be inflated at the base station 401 for deployment and may be deflated at the base station after a message has been broadcast. The inflation and deflation mechanisms 406 may be controlled by an operator or controlled automatically by the control 408 and by pressure sensors in the inflation/deflation mechanism 406.

The base station 401 may optionally include a cradle 420 for stabilizing or holding the airship 402 in a retracted position.

The base station may be powered by a connection to a power grid, by one or more batteries (e.g., rechargeable batteries), and/or by a generator included with the base station.

Figure 5:
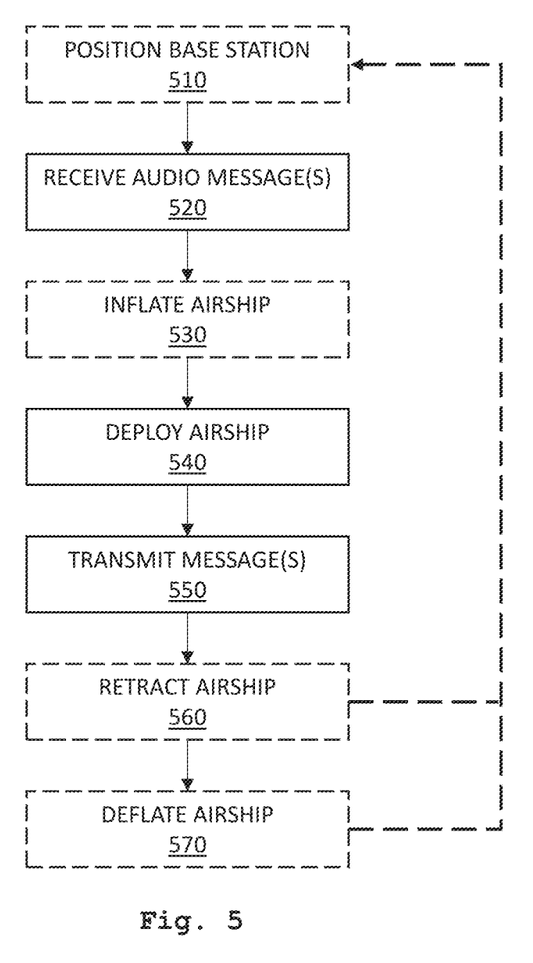
FIG. 5 is a flowchart of a method for broadcasting one or more audio messages according to an embodiment of the present disclosure.

FIG. 5 is a flow chart of a method for broadcasting one or more audio messages (i.e., using the sound system). For embodiments including a movable base station, the method begins by positioning 510 the base station at a location within an area to receive an audio message (i.e., broadcast area). This location is typically located near the center of the broadcast area.

Next, the message or messages for broadcast are received at the base station. The messages may be received 520 wirelessly when the base station is connected to a wireless network (e.g., WI-FI) or directly from a wired communication link (e.g., analog or digital). Alternatively, the message(s) may be received or produced at the base station. For example, a pre-recorded message may be received for a memory storage medium integrated with the base station. In another example, a live message may be received at the base station from a microphone attached to the base station.

The airship is deployed 540 to elevate the speaker unit. Deploying may include inflating 530 the airship at the base station. After the airship is deployed, the message(s) are transmitted 550 to the speaker unit for broadcast to an area within the speaker unit's range and directivity. The messages may include speech (e.g., announcement, instructions, etc.) and non-speech (e.g., a warning tone or siren). After the transmission, the air ship may remain aloft for additional messages; however, in some embodiments the airship is then retracted 560 and deflated 570 for storage. For example, the airship may be stored at the base station.

This process may be repeated as many times as necessary. For example, the sound system may be repeatedly moved to new locations for broadcasting the same message or different messages. The airship may be deflated before relocating the base station (e.g., for large airships) or may be relocated while inflated (e.g., for small airships).

In the specification and/or figures, typical embodiments have been disclosed. Those skilled in the art will also appreciate that various adaptations and modifications of the preferred and alternative embodiments described above can be configured without departing from the scope and spirit of the disclosure. Therefore, it is to be understood that, within the scope of the appended claims, the disclosure may be practiced other than as specifically described in the typical embodiments disclosed.

The invention claimed is:

1. A method for broadcasting one or more audio messages, the method comprising:
   receiving, at a base station, the one or more audio messages;
   receiving, at the base station, a desired broadcast cover region for the one or more audio messages;
   computing, by a processor of the base station, an appropriate height of a lighter-than-air airship above the base station in order to achieve the desired broadcast cover region, the lighter-than-air airship connected to the base station via a spooled tether and comprising a speaker unit communicatively coupled to the base station, wherein performance characteristics of the speaker unit and/or current weather/wind conditions are used by the processor in computing the appropriate height;
   deploying, by the processor, the lighter-than-air airship to the appropriate height by automatically unspooling the tether; and
   transmitting, when the lighter-than-air airship is at the appropriate height, the one or more audio messages from the base station to the speaker unit for broadcasting.

2. The method according to claim 1, wherein the tether comprises one or more cables electrically connected to the speaker unit, the one or more cables conducting power and/or audio signals from the base station to the speaker unit.

3. The method according to claim 1, further comprising:
   inflating the lighter-than-air airship with a buoyant gas at the base station via an inflation mechanism of the base station before deploying a lighter-than-air airship from the base station.

4. The method according to claim 1, wherein the deploying the lighter-than-air airship from the base station comprises:
   unspooling the tether from a tether-reel mechanism of the base station to raise the lighter-than-air airship to the appropriate height.

5. The method according to claim 1, wherein the appropriate height is in a range of about 20 to 4000 feet above the base station.

6. The method according to claim 1, wherein the transmitting the one or more audio messages from the base station to the speaker unit is wireless.

7. The method according to claim 6, wherein the speaker unit comprises a battery for operation.

8. The method according to claim 1, wherein the base station is trailer mounted, truck mounted, or permanently mounted in a fixed location.

9. The method according to claim 1, wherein the lighter-than-air airship is a balloon.

10. The method according to claim 1, wherein the light-than-air airship is a blimp.

11. The method according to claim 10, wherein the blimp comprises one or more propulsion mechanisms controllable by the base station.

12. The method according to claim 11, wherein the speaker unit comprises one or more gimbal positioners controllable by the by the processor of the base station.

13. The method according to claim 12, wherein the deploying the lighter-than-air airship from the base station comprises:
   controlling, by the processor, the one or more propulsion mechanisms or the one or more gimbal positioners to set or maintain a direction of broadcasting or an area receiving the broadcast.

14. The method according to claim 1, wherein the receiving, at the base station, the one or more audio messages comprises:
   obtaining the one or more audio messages from a memory of the base station.

15. The method according to claim 1, wherein the receiving, at the base station, the one or more audio messages comprises:
   obtaining the one or more audio messages from a microphone that is communicatively coupled to the base station.

16. The method according to claim 1, wherein the receiving, at the base station, the one or more audio messages comprises:

obtaining the one or more audio messages from a computer network that is communicatively coupled to the base station.

17. The method according to claim 1, further comprising:
retracting the lighter-than-air airship to the base station after the one or more audio messages are transmitted.

18. The method according to claim 17, further comprising:
deflating the lighter-than-air airship at the base station via an deflation mechanism of the base station after retracting the lighter-than-air airship to the base station.

19. A sound system for broadcasting one or more audio messages, the sound system comprising:
a lighter-than-air airship comprising an inflatable envelope that when filled with a buoyant gas provides buoyant lift, a tether spooled on a reel connected to the inflatable envelope, and a connection member at a bottom portion of inflatable envelope;
a speaker unit attached to the connection member of the airship and directed in a downward direction away from the lighter-than-air airship; and
a base station that is communicatively coupled to the speaker unit, the base station comprising a tether-reel mechanism connected to the tether, and a processor, wherein the processor is configured by program instructions to:
obtain the one or more audio messages;
receive a desired broadcast cover region for the one or more audio messages;
compute an appropriate height of the lighter-than-air airship above the base station in order to achieve the desired broadcast cover region, wherein performance characteristics of the speaker unit and/or current weather/wind conditions are used in computing the appropriate height;
engage the tether-reel mechanism to raise the airship to the appropriate height;
transmit the one or more audio messages to the speaker unit for broadcasting.

20. The sound system according to claim 19, wherein the tether comprises one or more cables that are electrically connected to the speaker unit, the one or more cables conducting power and audio signals from the base station to the speaker unit.

21. The sound system according to claim 19, wherein the base station further comprises:
an inflation mechanism connectable to the lighter-than-air airship, the inflation mechanism controlled by the processor to fill the inflatable envelope with the buoyant gas.

22. The sound system according to claim 19, wherein the tether-reel mechanism is a rotatable spool that holds the tether, the tether-reel mechanism controllable by the processor to unspool the tether to raise the lighter-than-air airship or spool the tether to lower the lighter-than-air airship.

23. The sound system according to claim 19, wherein the appropriate height is in a range of about 20 to 4000 feet above the base station.

24. The sound system according to claim 19, wherein the speaker unit receives message from the base station wirelessly.

25. The sound system according to claim 24, wherein the speaker unit comprises a battery for operation.

26. The sound system according to claim 19, wherein the base station is trailer mounted, truck mounted, or permanently mounted in a fixed location.

27. The sound system according to claim 19, wherein the lighter-than-air airship is a balloon.

28. The sound system according to claim 19, wherein the lighter-than-air airship is a blimp.

29. The sound system according to claim 19, wherein the blimp comprises one or more propulsion mechanisms controllable by the processor.

30. The sound system according to claim 29, wherein the speaker unit comprises one or more gimbal positioners controllable by the processor.

31. The sound system according to claim 30, wherein the processor is further configured by program instructions to:
control the one or more propulsion mechanisms or the one or more gimbal positioners to set or maintain a direction of broadcasting for the desired broadcast cover region.

32. The sound system according to claim 19, wherein the processor obtains the message from a memory.

33. The sound system according to claim 19, wherein the processor obtains the one or more audio messages from a microphone that is communicatively coupled to the base station.

34. The sound system according to claim 19, wherein the processor obtains the one or more audio messages from a computer network that is communicatively coupled to the base station.

35. The sound system according to claim 19, wherein the processor is further configured by program instructions to:
engage the tether reel mechanism to lower the lighter-than-air airship after transmitting the message.

36. The sound system according to claim 19, wherein the base station further comprises:
a deflation mechanism connectable to the lighter-than-air airship, the deflation mechanism controlled by the processor to remove the buoyant gas from the inflatable envelope.

* * * * *